(12) United States Patent
Hendrix

(10) Patent No.: US 8,225,849 B2
(45) Date of Patent: Jul. 24, 2012

(54) CHARGE INTERCOOLER FOR A MOTOR VEHICLE

(75) Inventor: Daniel Hendrix, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 1570 days.

(21) Appl. No.: 10/574,223

(22) PCT Filed: Sep. 29, 2004

(86) PCT No.: PCT/EP2004/010876
§ 371 (c)(1),
(2), (4) Date: Aug. 16, 2006

(87) PCT Pub. No.: WO2005/033489
PCT Pub. Date: Apr. 14, 2005

(65) Prior Publication Data
US 2007/0175612 A1    Aug. 2, 2007

(30) Foreign Application Priority Data
Oct. 2, 2003 (DE) .................. 103 46 540

(51) Int. Cl.
*F01N 5/02* (2006.01)
*F28F 27/02* (2006.01)
*F02B 33/00* (2006.01)
*F02M 25/07* (2006.01)

(52) U.S. Cl. .............. 165/101; 165/51; 123/568.12
(58) Field of Classification Search .................. 165/101, 165/162, 51, 150–153, 140; 123/568.12
See application file for complete search history.

(56) References Cited

U.S. PATENT DOCUMENTS

| | | | | |
|---|---|---|---|---|
| 447,285 A * | 3/1891 | Alberger | ............... | 165/101 |
| 687,735 A * | 12/1901 | Elmendorf | ................. | 122/20 B |
| 780,736 A * | 1/1905 | Stack | ................. | 122/20 B |
| 1,918,966 A * | 7/1933 | Harkness | ................. | 165/101 |
| 2,063,436 A * | 12/1936 | Hild | ................. | 123/196 R |
| 2,076,287 A * | 4/1937 | Arnold | ................. | 237/12.3 B |
| 2,291,637 A * | 8/1942 | Kohlmann | ................. | 165/297 |
| 2,670,933 A * | 3/1954 | Bay | ................. | 165/297 |
| 2,908,485 A * | 10/1959 | Longwell | ................. | 165/101 |
| 3,034,770 A * | 5/1962 | Hiersch | ................. | 165/103 |
| 3,122,202 A * | 2/1964 | Scharres | ................. | 165/298 |
| 3,353,590 A * | 11/1967 | Holman | ................. | 165/297 |
| 3,440,833 A * | 4/1969 | Fernandes | ................. | 165/297 |
| 3,513,907 A * | 5/1970 | Hughes | ................. | 165/166 |
| 3,514,967 A * | 6/1970 | Vander | ................. | 62/180 |
| 3,656,543 A * | 4/1972 | Wolowodiuk et al. | ......... | 165/74 |
| 3,743,011 A * | 7/1973 | Frost | ................. | 165/297 |
| 3,852,147 A * | 12/1974 | Wilson | ................. | 165/101 |
| 4,319,630 A * | 3/1982 | Hronek et al. | ................. | 165/297 |

(Continued)

FOREIGN PATENT DOCUMENTS
DE        31 03 198 A1     8/1982
(Continued)

*Primary Examiner* — Ljiljana Ciric
(74) *Attorney, Agent, or Firm* — Muncy, Geissler, Olds & Lowe, PLLC

(57) ABSTRACT

A charge intercooler for a motor vehicle includes a heat transfer block with tubes through which charge air flows, airboxes connected to the tubes that form a charge air inlet and a charge air outlet, and a movable body mounted in one of the airboxes for selectively blocking at least some of the tubes.

11 Claims, 7 Drawing Sheets

U.S. PATENT DOCUMENTS

| | | | | |
|---|---|---|---|---|
| 4,385,496 A | * | 5/1983 | Yamane | 123/563 |
| 4,432,410 A | * | 2/1984 | Cadars | 165/296 |
| 4,561,496 A | * | 12/1985 | Kehrer | 165/103 |
| 4,593,749 A | * | 6/1986 | Schatz | 165/41 |
| 4,887,664 A | * | 12/1989 | Nehrbauer | 165/76 |
| 4,993,367 A | * | 2/1991 | Kehrer | 122/7 R |
| 5,152,144 A | * | 10/1992 | Andrie | 60/599 |
| 5,452,686 A | * | 9/1995 | Stahl | 165/101 |
| 5,732,688 A | * | 3/1998 | Charlton et al. | 123/568.12 |
| 5,911,212 A | * | 6/1999 | Benson | 123/563 |
| 5,950,715 A | * | 9/1999 | Jonsson et al. | 165/103 |
| 6,052,995 A | * | 4/2000 | Krimmer et al. | 60/611 |
| 6,141,961 A | * | 11/2000 | Rinckel | 60/288 |
| 6,330,910 B1 | * | 12/2001 | Bennett | 165/51 |
| 6,807,955 B2 | * | 10/2004 | Leedham et al. | 123/568.12 |
| 7,007,680 B2 | * | 3/2006 | Tussing et al. | 123/568.12 |
| 7,032,577 B2 | * | 4/2006 | Rosin et al. | 165/103 |
| 7,055,584 B2 | * | 6/2006 | Brost | 165/153 |
| 7,163,005 B2 | * | 1/2007 | Tussing et al. | 123/568.12 |
| 7,168,419 B2 | * | 1/2007 | Rosin et al. | 165/101 |
| 7,264,040 B2 | * | 9/2007 | Bush et al. | 165/103 |
| 7,305,976 B1 | * | 12/2007 | Clarke | 123/568.12 |
| 7,353,865 B2 | * | 4/2008 | Speer | 165/51 |
| 7,412,945 B2 | * | 8/2008 | Jekerle et al. | 165/101 |
| 7,584,782 B1 | * | 9/2009 | Bizzarro | 165/101 |
| 7,743,816 B2 | * | 6/2010 | Mercz et al. | 165/51 |
| 2003/0111211 A1 | * | 6/2003 | Stonehouse et al. | 165/103 |
| 2003/0159801 A1 | * | 8/2003 | Koenig | 165/48.1 |
| 2005/0028796 A1 | * | 2/2005 | Tussing et al. | 123/568.22 |
| 2005/0039729 A1 | * | 2/2005 | Rosin et al. | 123/568.12 |
| 2005/0081523 A1 | * | 4/2005 | Breitling et al. | 123/563 |
| 2005/0269062 A1 | * | 12/2005 | Guerrero et al. | 165/101 |
| 2006/0016439 A1 | * | 1/2006 | Tussing et al. | 123/568.22 |
| 2006/0162706 A1 | * | 7/2006 | Rosin et al. | 123/568.12 |
| 2007/0157983 A1 | * | 7/2007 | Beck et al. | 137/875 |
| 2007/0204925 A1 | * | 9/2007 | Bolderheij et al. | 137/801 |
| 2009/0090495 A1 | * | 4/2009 | Domes et al. | 165/165 |

FOREIGN PATENT DOCUMENTS

| | | |
|---|---|---|
| DE | 32 18 984 A1 | 11/1983 |
| DE | 198 57 435 A1 | 6/1999 |
| DE | 199 62 861 A1 | 6/2001 |
| DE | 199 62 863 A1 | 6/2001 |
| DE | 102 03 003 A1 | 8/2003 |
| DE | 103 48 136 A1 | 5/2005 |
| EP | 1 336 736 A2 | 8/2003 |
| JP | 58-62495 * | 4/1983 |
| JP | 59-145325 A | 8/1984 |
| JP | 59-190425 A | 10/1984 |
| JP | 60-050225 | 3/1985 |
| JP | 61-237998 A | 10/1986 |
| JP | 62-046194 A | 2/1987 |

* cited by examiner

CHARGE INTERCOOLER FOR A MOTOR VEHICLE

FIELD OF THE INVENTION

The invention relates to a charge intercooler for a motor vehicle.

BACKGROUND OF THE INVENTION

Charge intercoolers for motor vehicles are known; they serve to cool the combustion air compressed by a compressor or turbocharger in order to obtain a better filling of the cylinders, i.e. a better charging efficiency. For motor vehicles, use is generally made of air-cooled charge intercoolers, as have been disclosed, for example, by DE-A 198 57 435 or DE-A 199 62 861 of the applicant. The charge intercooler generally has a heat exchanger unit or a "network" which comprises tubes, generally flat or rectangular tubes, between which corrugated fins are arranged to enlarge the heat exchange surface. The tubes are held by their tube ends in tube plates. Tubes, fins and tube plates are composed of aluminum materials and are soldered to one another. "Air boxes" which act as distributors or header boxes for the charge air are placed onto the tube plates. These air boxes may also be composed of an aluminum material, but likewise of plastic. In certain cases of use, liquid-cooled charge intercoolers are also used, with the coolant of the cooling circuit of the internal combustion engine serving to cool the charge air. The charge intercooler for a motor vehicle is usually fastened in front of or behind the coolant cooler and is frequently part of a cooling module which is arranged in the front engine compartment of the motor vehicle.

In the case of passenger vehicle diesel engines, due to the formation of particulates in the exhaust gas use is made more and more of particulate filters which have to be regenerated at certain intervals. In the case of certain types of particulate filters, a raising of the exhaust gas temperature is required for the regeneration (particulate burn-off), which is often not achievable when outside temperatures are cold. The invention is based on the fact that, under some circumstances, with the aid of a reduced cooling of the charge air the increased exhaust gas temperature for a particulate burn-off can be achieved. In addition, in particular in the case of cold ambient temperatures, an accelerated warming up of the vehicle engine is possible.

SUMMARY OF THE INVENTION

It is therefore the object of the present invention to equip a charge intercooler of the type mentioned at the beginning with means which, when the need arises, permit a reduced cooling of the charge air in comparison to the standard cooling of the charge air.

According to the invention, it is provided that, for the reduced cooling, a certain number of tubes of the charge intercooler is shut off, i.e. the charge air is prevented from flowing through these tubes. Accordingly, for example, only 10 percent to 30 percent of the tubes have charge air flowing through them, which results in a lesser cooling of the emerging charge air. The advantage achieved by this is that—even in the—case of unfavorable outside conditions, for example low outside temperatures—an increased exhaust gas temperature required for filter regeneration or a particulate burn-off is obtained.

According to an advantageous refinement of the invention, the tubes through which charge air is not to flow are closed by a shut-off member which is preferably arranged in one of the air boxes, i.e. on the inlet side or outlet side. It is of advantage here that the shut-off member is integrated in the charge intercooler and does not have to be fitted separately. In addition to the ambient temperature, the charging pressure, the charge air temperature, the charge air mass flow, the rotational speed of the engine, the engine load, the operating point of the compressor, the driving speed or the temperature of the coolant, individually or in any desired combination, are also possible controlled variables for the closing or for the shut-off member. The actuating member is preferably produced from metal, in particular aluminum, or from plastic.

Shut-off members for closing a number of tubes are known for exhaust gas heat exchangers. For example, an exhaust gas heat exchanger for an exhaust gas additional heating system has been disclosed by DE-A 199 62 863 of the applicant, with the exhaust gas being directed by means of a "switch" either through the exhaust gas heat exchanger or through a bypass. The switch is designed as a flexible actuating element. Other forms of exhaust gas flaps or closure members have been disclosed by DE-A 102 03 003, with this exhaust heat exchanger also having an integrated bypass with a switch, and the exhaust gas flow being directed either through all of the tubes of the exhaust gas heat exchanger or through the bypass. Finally, DE-C 31 03 198 and DE-C 32 18 984 have disclosed exhaust gas heat exchangers for heating motor vehicles, with the exhaust gas flow being directed through different flow passages by means of flaps arranged in the heat exchanger. The heating power is thereby to be matched to different exhaust gas flows.

According to an advantageous refinement of the invention, the flap is designed as a preferably rectangular flap with a lateral pivot axis, said flap being arranged in the immediate region of the tube ends and therefore covering or closing some of the tube ends. The flap can be arranged and fastened in the air box in a relatively simple manner. When the flap is open, i.e. the tubes are not closed, the bearing of the flap against the wall of the charge air box does not cause any additional drop in pressure for the standard charge air cooling in which all of the tubes have charge air flowing through them.

According to an embodiment, the flap has at least one cutout for one or more nonclosable tubes. Thus, in a specific manner, one or more tubes remain open at desired positions.

According to a further advantageous refinement of the invention, the air box is divided by a transverse partition into two chambers, with each chamber being assigned some of the total number of charge air tubes. The two chambers are preferably brought together in a funnel-shaped passage (bottleneck) where the shut-off member is arranged. The latter closes one of the two chambers, preferably the chamber with a higher number of tubes, as a result of which the flow charge air through these tubes is prevented. The advantage of this solution is that the shut-off member can be designed to be smaller than the cross-sectional area of the tubes that is to be covered, as a result of which the actuating forces for displacing the shut-off member are also lower. This constricted passage cross section is preferably of round design and the cross section of the flap is correspondingly matched.

According to a further embodiment, the shut-off member is designed as a rotary slide. For example, a wall which is arranged in particular along a circumference of a cylinder is rotated about an axis and, in one position, blocks some of the tubes while the tubes are open in another position of the rotary slide.

According to an embodiment, the shut-off member is designed as a half-round flap with a lateral or central pivot axis. Under some circumstances, it is possible for the flap to be placed against a wall, in particular a partition, during opening. In this case, a reduction in the flow resistance caused by the flap is possible.

According to a further embodiment, the shut-off member has sections for covering individual tubes, so that these tubes can be blocked. In this case, the covering sections are preferably mounted in a manner such that they can be displaced and/or rotated together. In particular, the covering sections can be displaced between a position covering the tube ends and a position offset with respect to the tube axes. In another example, the covering sections are mounted on a common axis, with the axis extending in the longitudinal direction of a tube row. It is likewise possible to rotate and to slide individual covering sections at the same time out of the mouth region of individual tubes.

According to an embodiment, some of the tubes can be completely closed. According to further exemplary embodiments, individual tubes, in particular all of the tubes, can in each case only partially be closed. In addition to the complete closing of some of the tubes, it is also possible to close all of the tubes, with then at least some of the individual tubes only being partially closed, so that the charge intercooler can have charge air flowing through it at all times.

The charge intercooler has air flowing through it in a U-shaped manner, i.e. twice and, on one side, has a charge air box with an entry and exit opening and a partition and, on the other side, a deflecting box. A shut-off member preferably a round pivoting flap, is arranged in the partition. The advantage of a reduced charge air cooling when the flap is open is therefore likewise achieved because a considerable portion of the charge air flowing in passes directly, i.e. without cooling, into the outlet. The advantage of this solution is above all the fact that the shut-off member in the partition is constructively relative simple to control and is therefore associated only with a little additional outlay.

BRIEF DESCRIPTION OF THE DRAWINGS

Exemplary embodiments of the invention are illustrated in the drawing and are described in more detail below.

In the drawing

DETAILED DESCRIPTION

Figure 1:
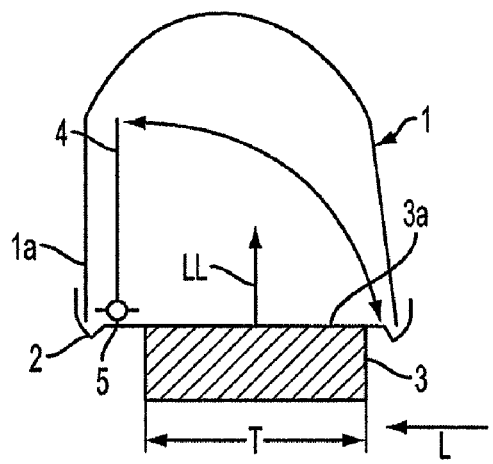
FIGS. 1, 1a show a first exemplary embodiment of the invention with a pivoting flap.

FIG. 1 shows, in a diagrammatic illustration, an air box 1 on the exit side of a charge intercooler (not entirely illustrated) which has a further air box on the entry side (not illustrated). The air box 1, on which an air outlet (not illustrated) is arranged, is placed onto a tube plate 2 and is connected thereto. The tube plate 2 is preferably produced from an aluminum material and has—perpendicularly to the plane of projection—a series of rims (not illustrated specifically) into which tubes 3 are inserted by their tube ends 3a and are soldered. The air box 1 can be produced from a plastic or aluminum material. Accordingly, the connection to the metallic tube plate 2 is a mechanical flared connection or a connection with a cohesive material joint, for example a soldered connection. The tubes 3 have a rectangular cross section, the long side of which with the depth T lies parallel to the plane of projection. Arranged between the tubes 3 are corrugated fins (not illustrated) which, together with the tubes 3, form a heat exchanger unit or a "network" through which ambient air flows in the direction of an arrow L. A charge intercooler of this type is usually arranged in the front region of an engine compartment (not illustrated) of a motor vehicle, generally together with further heat exchangers, such as, for example, a coolant cooler. In other embodiments, the charge intercooler is arranged in the vicinity of the vehicle engine.

A pivotable flap 4 whose pivot axis 5 is situated next to the tube end 3a and in the region of the tube bottom 2 is arranged in the charge air box 1. The flap 4 is illustrated in an opened position, i.e. in an approximately parallel position to a side wall 1a of the air box 1. In order to close the tube or individual tubes 3, the flap 4 is pivoted through 90 degrees, so that it comes to lie on the tube end 3a and closes the latter. One or more cutouts 4a may optionally be provided in the flap 4 to leave one or more of the individual tubes 3 uncovered. The actuation of the flap 4 and the mounting thereof in the air box 1 are not illustrated and correspond to the prior art mentioned at the beginning. The flow through the charge air tube 3 takes place in the direction of the arrow LL, i.e. the flap 4 is opened with the flow pressure and is closed counter to the flow pressure. A flap arrangement (not illustrated) in the air box on the charge air entry side is likewise possible. The arrow LL would then have to point in the opposite direction.

Figure 1A:
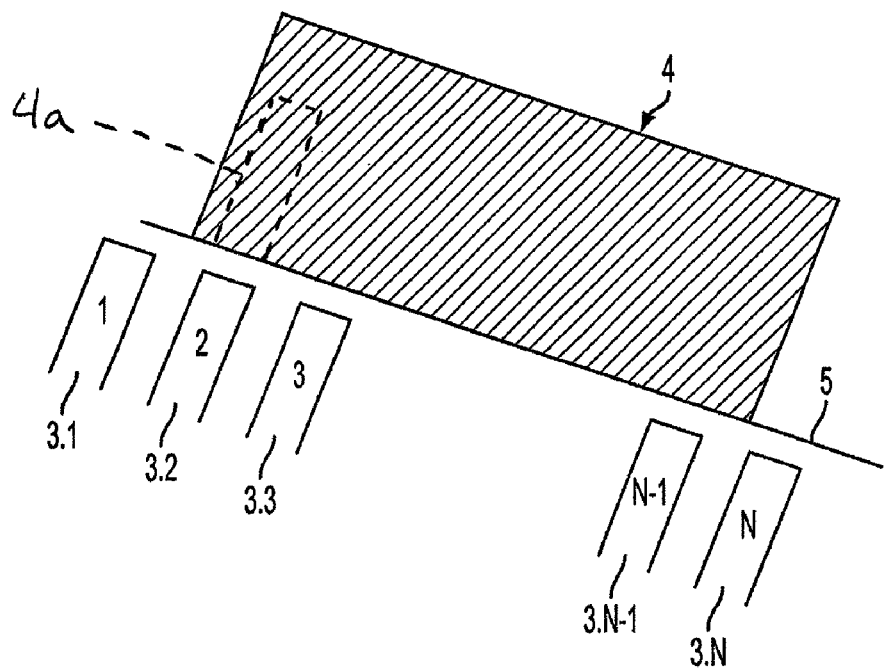

FIG. 1a shows an enlarged illustration of the flap 1 in relation to the tubes 3.1, 3.2, 3.3, 3.N-1 and 3.N which form a row R. The flap axis 5 of the flap 4 is arranged somewhat above the tube ends and is mounted in a manner not illustrated. The flap 4 is of rectangular design and has a height H and a width B. The height H corresponds at least to the depth T (cf. FIG. 1) of the tubes 3, so that the tube cross sections are covered when the flap is closed. The width B in FIG. 1a is selected in such a manner that the tubes 3.2 to 3.N-1 are covered when the flap 4 is closed, and only the two outer tubes 3.1 and 3.N remain open and have charge air passing through them.

In exemplary embodiments which are not shown, only one tube or a plurality of tubes, in particular more than two tubes, remains or remain open. These tubes are arranged on one or both edges of a respective tube row. However, tubes in the center of a tube row may also remain open. For this purpose, a plurality of flaps or preferably one flap with cutouts are used, with the cutouts being assigned to the tubes which are to remain open.

Figure 2:
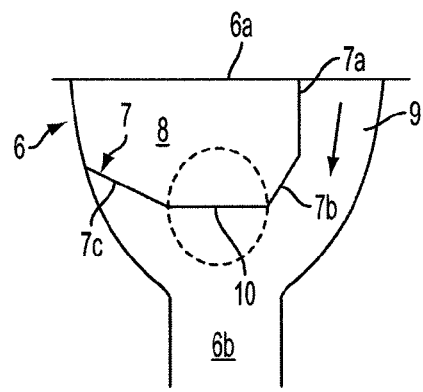
FIG. 2 shows a second exemplary embodiment with a round flap.

FIG. 2 shows a further exemplary embodiment of the invention with an air box 6 on the outlet side which is connected in a plane 6a to a tube plate (not illustrated) or to a heat exchanger unit with tubes opening into the tube plate. A charge air outlet 6b is arranged on that side of the air box 6 which faces away from the plane 6a. Arranged within the charge air box 6 is an angled partition 7 which is composed of three regions 7a, 7b, 7c and divides the air box 6 into two chambers, namely a first closable chamber 8 and a second passage chamber 9. A round pivoting flap 10, the circumference 10a of which is illustrated in the passage position by dashed lines, is arranged between the partition regions 7b, 7c. The closure position is illustrated by the solid line 10. A first number of tubes (not illustrated) open into the closable chamber 8, and a second number of tubes (not illustrated) open into the passage chamber 9, said second number—in accordance with the graphical illustration—being smaller than the first number, i.e. approximately in the ratio of 1:2 to 1:5.

When the chamber 8 is closed, only those tubes which open into the passage chamber 9 therefore have charge air passing through them. Accordingly, the cooling of the charge air which leaves the charge intercooler via the outlet 6b is less than if the flap 10 were opened and the flow passed through all of the tubes of the charge intercooler.

Figure 3:
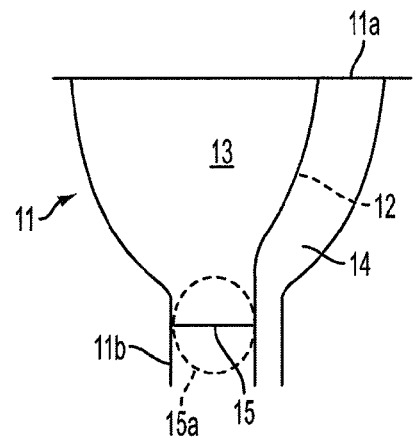
FIG. 3 shows a further exemplary embodiment with a round flap and a partition in the air box.

FIG. 3 shows a modified exemplary embodiment of the invention with an air box 11 which, with a plane 11a, adjoins a heat exchanger unit (not illustrated) of a charge intercooler (not illustrated). The air box 11 has an exit connecting piece 11b and a partition 12 (illustrated by dashed lines) which extends from the parting plane 11a into the exit connecting piece 11b. The partition 12 divides the air box 11 into a first larger chamber 13 and a second smaller chamber 14, a "passage chamber". The chamber 13 can be closed in the region of the exit connecting pipe 11b by a round pivoting flap 15, the circumference of which 15a is illustrated by dashed lines.

When flap 15 corresponding to the solid line 15 is closed, the chamber 13 into which a first number of tubes (not illustrated) open is closed, i.e. the flow through these tubes is interrupted. By contrast, the tubes (not illustrated) opening into the passage chamber 14 are open and have charge air passing through them, the charge air therefore being cooled. Overall, when the flap 15 is closed, the charge air flowing through the charge intercooler is cooled less powerfully than when the flap 15 is open (standard cooling).

Figure 4:
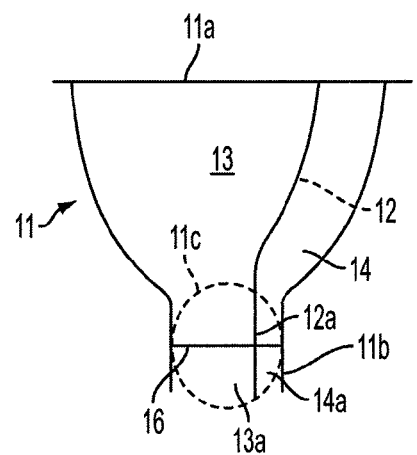
FIG. 4 shows a modified exemplary embodiment with a partition and a flap with cutouts.

FIG. 4 shows a modification of the exemplary embodiment according to FIG. 3 with the air box 11 and the partition 12 and the exit connecting pipe 11b which has a circular cross section swung into the plane of projection by a dashed line 11c. The cross section of the exit connecting pipe 11b is divided by a section 12a of the partition 12 into two partial cross sections 13a, 14a, the partial cross section 13a which corresponds to the chamber 13 being closable by a round pivoting flap 16. The pivoting flap 16 appears in the drawing in its closed position as a solid line 16 and in its open position as a dashed line 11c which is cut off by the partition section 12a, so that the full circle 11c (dashed line) is left open in the region of the partial cross section 14a. The partial cross section 14a is therefore always open. A perspective illustration of this embodiment is illustrated in the next figure.

Figure 5:
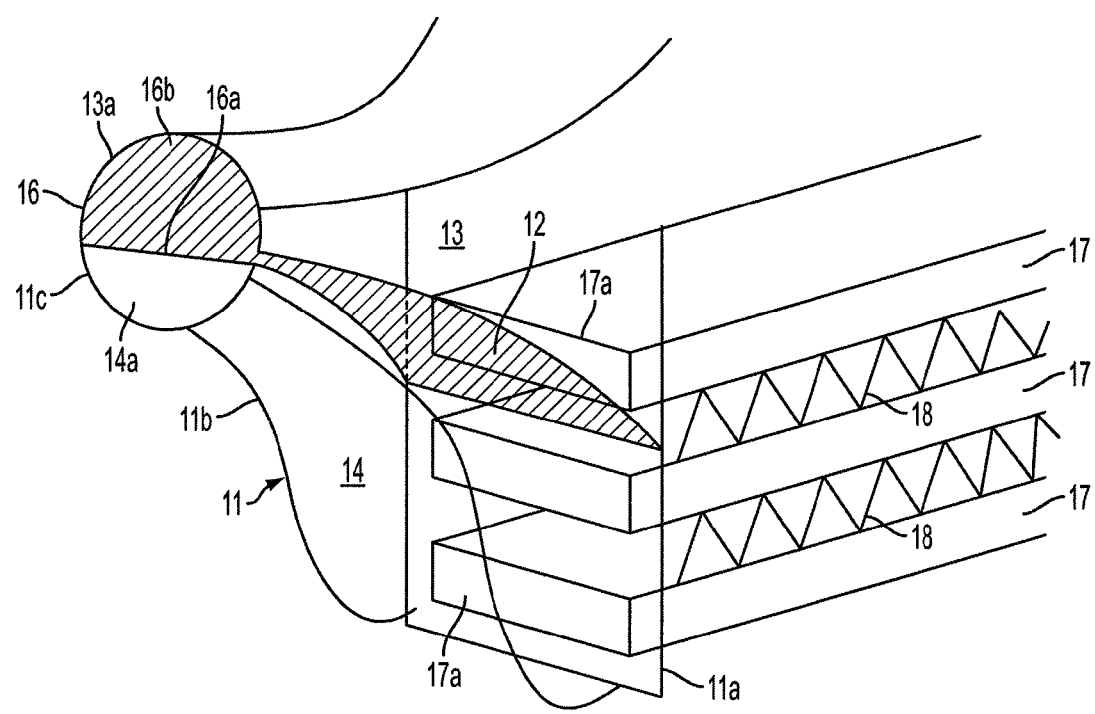
FIG. 5 shows a perspective illustration of the embodiment with the partition and half-round flap.

FIG. 5 shows the exemplary embodiment according to FIG. 4 in a perspective illustration, with the same reference numbers being used for the same parts. The charge air box 11, with the plane 11a, adjoins a tube plate (not illustrated) which receives tube ends 17a of rectangular tubes 17. Corrugated fins 18 are arranged between the rectangular tube 17 (tubes with an approximately rectangular flow cross section). The air box 11 covers the entire tube plate (not entirely illustrated) and is divided by the transverse partition 12 into the chambers 13 and 14.

The air box 11 narrows in the manner of a funnel to an entry connecting pipe (exit connecting pipe) 11b which has a circular cross section 11c. The circular cross section is divided by the partition 12 into the partial cross section 13a (sketched dark) and the partial cross section 14a. The half-round pivoting flap 16 is arranged in the partial cross section 13a and can either be pivoted about a flap axis 16a or alternatively about a pivot axis 16b. In both cases, the pivoting flap 16 closes or opens the partial cross section 13a with the charge air flow through the chamber 13 and the tubes connected to it being prevented. By contrast, the flow through the two tubes 17—situated at the bottom of the drawing—which open into the chamber 14 is not interrupted. These flow passages always remain open. The activation of the flap 16 is not illustrated; it takes place from the outside, for example in a manner as explained in the prior art explained at the beginning for exhaust gas heat exchangers.

Figure 6:
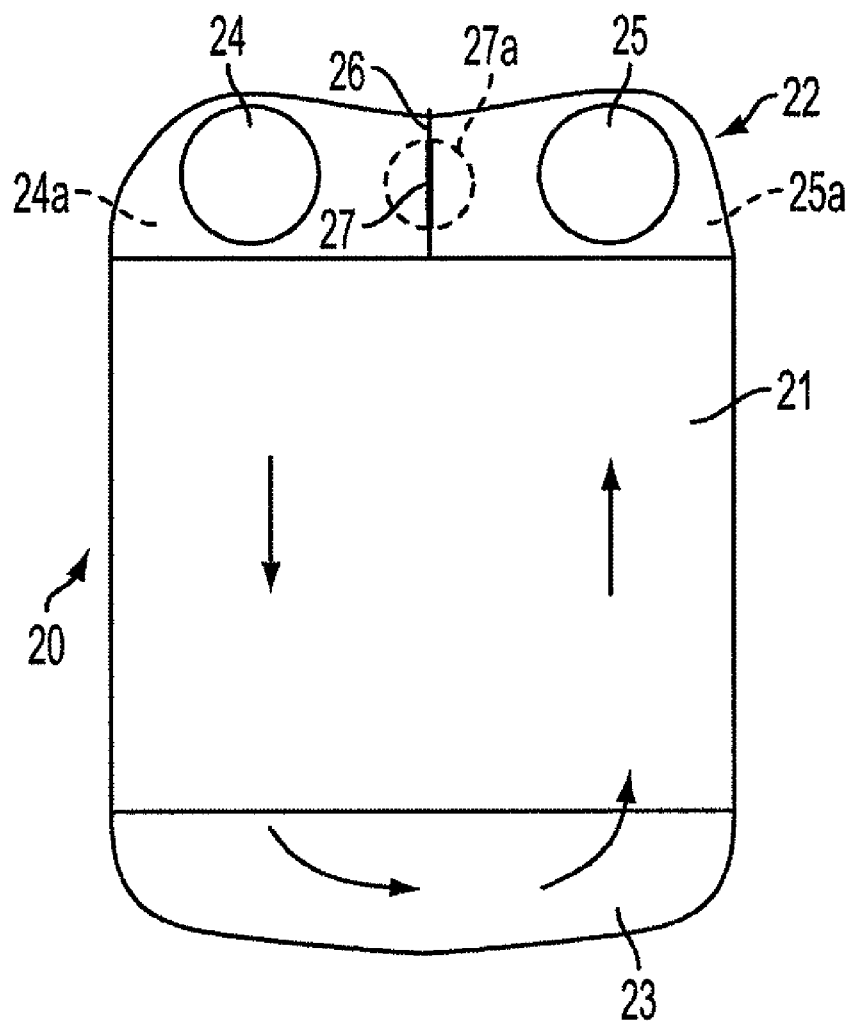
FIG. 6 shows an exemplary embodiment with a flap in a partition.

FIG. 6 shows a further exemplary embodiment of the invention for a charge intercooler 20 which has a heat exchanger unit 21, an upper air box 22 and a lower air box 23, a "deflecting box". The upper air box 22 has an entry connecting pipe 24 and an exit connecting pipe 25 and a partition 26 which is arranged between the two and divides the air box 22 into an inlet chamber 24a and an outlet chamber 25a. The flow therefore passes through the charge intercooler 20 in a U-shaped manner, i.e. in two directions corresponding to the arrows P, from the top downward and from the bottom upward.

A round pivoting flap 27, the outline 27a of which is placed into the plane of projection as a broken line and the open position of which is marked is arranged in the partition 26. The pivoting flap 27, which can be activated from the outside in a manner not illustrated, therefore opens up a circular cross section 27a in the partition 26 or closes the same. When flap 27 is closed, a standard charge air cooling takes place, i.e. up to 100 percent. When the flap 27 is open, only a partial flow rather than the entire charge air flows through the unit 21 corresponding to the arrows P. The rest of the flow passes directly from the inlet connecting pipe 24 through the opening in the partition 26 to the exit connecting pipe 25. Only a reduced cooling of the charge air therefore takes place, i.e. the charge air emerging from the exit connecting pipe 25 has a higher charge air temperature than in the case of standard cooling.

Figure 7A:
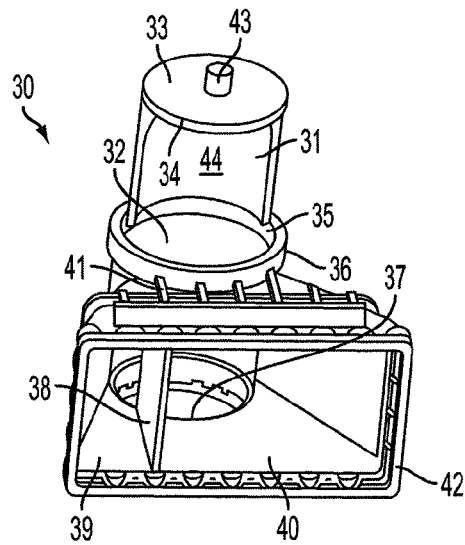
FIGS. 7a-c show an exemplary embodiment with a rotary slide.
Figure 7B:
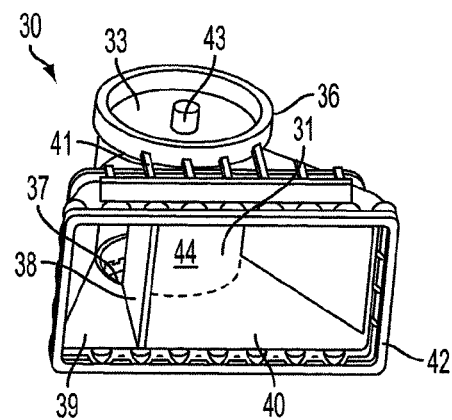
Figure 7C:
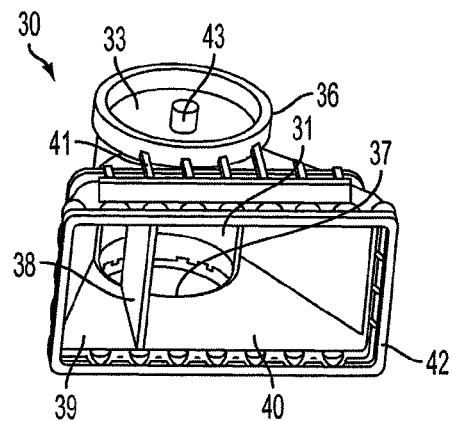

FIGS. 7a-c each show a header box 30 of a charge intercooler, in which, for clarity, the side facing a tube/fin network of the charge intercooler is not illustrated. A rotary slide 31 is illustrated in FIG. 7a before it is installed in the header box, in FIG. 7b in a first position for partial flow through the charge intercooler and in FIG. 7c in a second position for complete flow through the charge intercooler.

In the installed state, the rotary slide 31 delimits a cylindrical partial volume of the header box 30. In this case, part of the cylinder surface area is covered by the wall 44 of the rotary slide 31 and a remaining part of the cylinder surface area remains free. A shaft 43 as an extension of the cylinder axis of the cylindrical partial volume serves as engagement point for a rotation of the rotary slide 31 about the cylinder axis, with the rotation being driven, for example, by means of an actuator, such as an electric stepping motor, a negative pressure or positive pressure cell or the like. A rotation of this type enables a specific displacement of the wall 44 along the cylinder surface area.

A round opening 32 with an edge 36 in the header box 30 forms that end surface of the cylinder volume which is situated at the top in FIGS. 7a-c and serves to introduce the rotary slide 31 into the header box 30. An end wall 33 of the rotary slide 31, after it is installed, covers the opening 32 and, via the sealing surface 34 and the inner surface 35 of the edge 36 of the opening 32, seals off the interior of the header box 30 from the surroundings.

A round opening 37 in the header box 30 forms that end surface of the cylinder volume which is situated at the bottom in FIGS. 7a-c and serves for the admission of charge air to be cooled. For this reason, the opening 37 remains open and is also not covered by the rotary slide 31.

The header box 30 furthermore has a partition 38 which divides the interior of the header box 30 into a first subchamber 39 and a second subchamber 40. In this case, the first subchamber 39 is connected in terms of flow to tubes of a first tube group of the tube/fin network (not illustrated) while the second subchamber 40 is connected in terms of flow to tubes of a second tube group of the tube/fin network.

In addition, the header box 30 has reinforcing ribs 41 to stabilize its geometry during operation of the charge intercooler and a structure 42 for connection to a tube plate, the tube plate receiving the tube ends of the tube/fin network.

In normal operation of the charge intercooler (FIG. 7c), charge air flows through the opening 37 into the cylindrical partial volume, which is delimited by the rotary slide 31, of the header box 30 and is distributed to its subchambers 39 and 40 and from there to the corresponding tube groups of the tube/fin network. In this case, the ratio of the number of tubes of the first tube group to the number of tubes of the second tube group corresponds approximately to the cross-sectional ratio of the subchambers 39 and 40 and is preferably around 1:1 to 1:10, particularly preferably around 1:2 to 1:5.

By contrast, in an operation of the charge intercooler with reduced cooling of the charge air (FIG. 7b), the charge air only flows into the first subchamber 39, since the second subchamber 40 is blocked by the wall 44 of the rotary slide 31. For this purpose, the rotary slide is rotated with the aid of the shaft 43 from the position in FIG. 7c into the position in FIG. 7b.

Charge air is therefore only applied to the tubes of the first tube group and not to the tubes of the second tube group, with the result that the heat output which can be conducted away from the charge air is lowered in comparison to normal operation. The degree of this lowering of the heat output arises from the ratio of the number of tubes of the first tube group to the overall number of tubes of the charge intercooler. The proportion of closed tubes is preferably 50% to 90%, particularly preferably 70% to 80%, of the entire number of tubes.

Figure 8A:
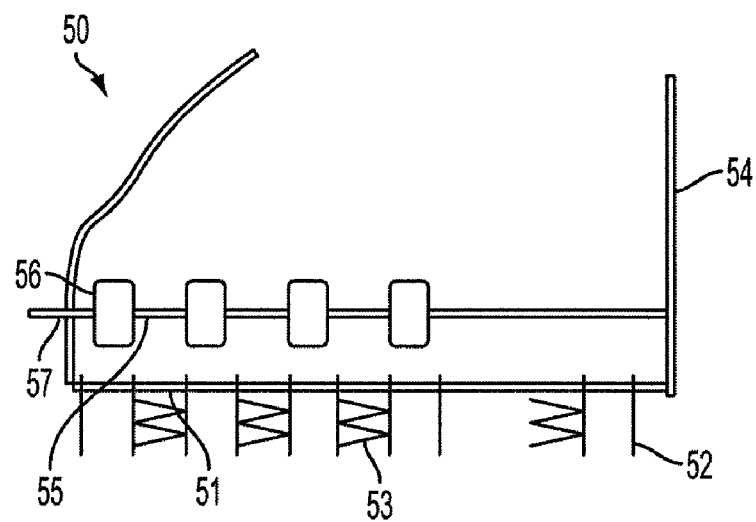
FIGS. 8a-b show an exemplary embodiment with a plurality of covering sections.
Figure 8B:
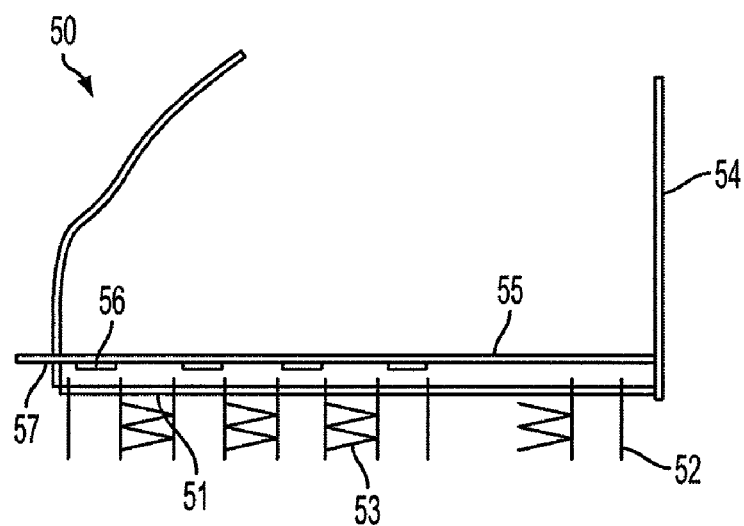

FIGS. 8a-b show a header box 50 of a charge intercooler diagrammatically in cross section. The header box 50 has a housing 54 and a tube plate 51 with openings for receiving the ends of tubes 52, with corrugated fins 53 being arranged between the tubes 52 to enlarge the heat-transferring surface area.

Covering sections 56 which are arranged opposite the ends of some of the tubes 52 are fastened on a shaft 55. The shaft 55 is mounted rotatably on one side of the header box 50 and, on the other side thereof, is guided out of the header box 50 through an opening 57. The shaft 55 is in turn driven, for example, by means of an actuator, such as an electric stepping motor, a negative pressure or positive pressure cell.

In a first position (FIG. 8a), the covering sections 56 extend parallel to the tubes 52, so that charge air which enters the header box 50 can flow past the covering sections 56 into all of the tubes 52. Rotation of the shaft 55 through, for example, 90° makes it possible to reach a second position (FIG. 8b) in which the covering sections 56 cover some of the tubes 52 and therefore block them from the charge air. Charge air is therefore only applied to the remaining (uncovered) tubes, with the result that the heat output which can be removed from the charge air is lowered in comparison to normal operation.

In the case of a similar exemplary embodiment (not illustrated), covering sections are mounted displacably, in particular via a shaft which is similar to the shaft 55 and is itself mounted displacably. From a position covering the tubes, the covering sections can be displaced in particular in the longitudinal direction of the tubes or perpendicularly thereto into a position opening up the tubes.

Figure 9:
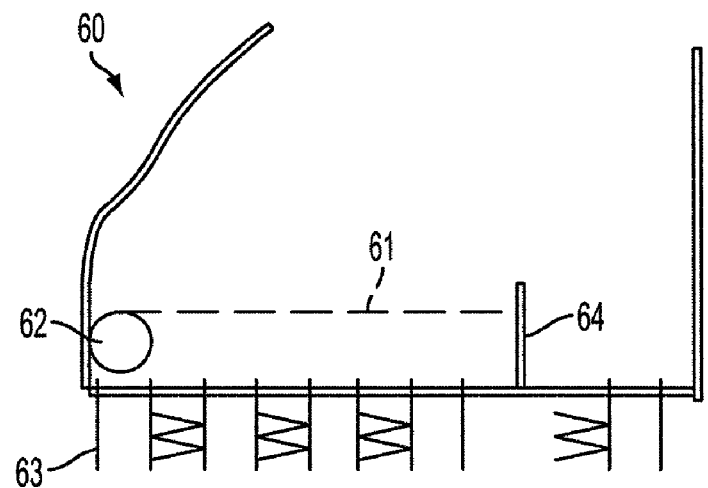
FIG. 9 shows an exemplary embodiment with a rolling louver.

FIG. 9 shows a similarly constructed header box 60 likewise in a diagrammatic cross section. In contrast to the exemplary embodiment shown in FIG. 8, in FIG. 9 covering sections 61 are not fastened on a rotatably mounted shaft but rather on a displaceable frame, a band, a chain or the like. The frame, the band or the chain are fastened, for example via a further chain or directly, to a roller 62, so that a displacement of the covering sections 61 between a first and a second position can be achieved via a rotation of the roller 62.

In the first position, the tube ends 63 are covered by the covering sections 61 and, in the second position, the covering sections 61 each come to lie next to the tube ends 63, with the result that, in the second position, all of the tubes are acted upon and the cooling power of the heat exchanger is lowered in the first position in comparison to the second position. A partition 64 serves, on the one hand, to separate the tube ends 63 which are to be covered from the remaining tube ends and, on the other hand, to support the frame, the band or the chain for the covering section 61.

Figure 10:
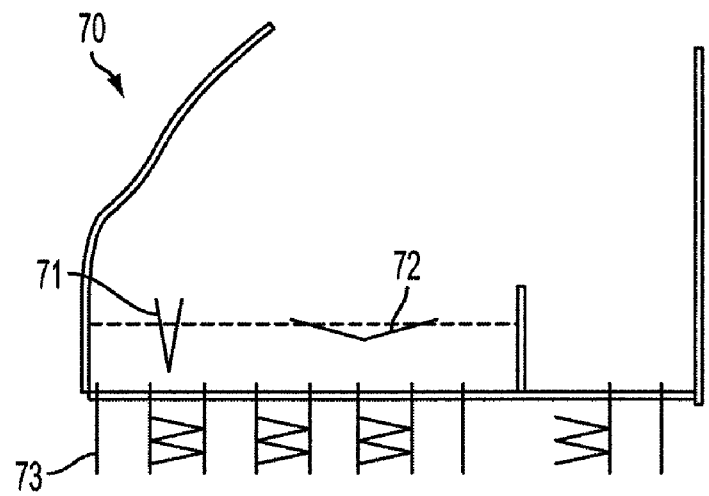
FIG. 10 shows a further exemplary embodiment with covering sections.

FIG. 10 shows a further header box 70 in a diagrammatic cross section. Covering sections 71, 72 are designed as two-winged flaps which, in a first position (71), permit all of the tubes 73 to be acted upon and, in contrast, in a second position 72, close some of the tubes 73. The two wings of each covering section 71, 72 are moved toward one another for opening purposes but by contrast, for closing purposes, are moved away from one another.

The invention has been explained using examples for a motor vehicle charge intercooler. However, attention is drawn to the fact that the invention is also suitable for other purposes.

The invention claimed is:

1. A charge intercooler for a motor vehicle, comprising a heat exchanger unit with tubes through which charge air can flow and comprising air boxes which are connected to the tubes and have a charge air inlet and a charge air outlet, wherein one of the air boxes includes a partition wall dividing the one of the air boxes into first and second portions and including a rotary slide rotatable from a first position blocking airflow through said first portion to a second position allowing air flow through said first portion and said second portion.

2. The charge intercooler as claimed in claim 1, wherein some of the tubes are in communication with the first portion.

3. The charge intercooler as claimed in claim 2, wherein the rotary slide is arranged in the charge air box.

4. The charge intercooler as claimed in claim 2, wherein the rotary slide is arranged in a region of the charge air outlet.

5. The charge intercooler as claimed in claim 2, wherein the partition wall divides the air box into two chambers with two flow cross sections.

6. The charge intercooler as claimed in claim 1, wherein an airflow through some of the tubes can be completely blocked.

7. The charge intercooler as claimed in claim 1, wherein an airflow through some of the tubes can partially blocked.

8. The charge intercooler as claimed in claim 1, wherein an airflow through all of the tubes can be at least partially blocked.

9. A charge intercooler for a motor vehicle, comprising a heat exchanger unit with tubes through which charge air can flow and comprising air boxes which are connected to the tubes and have a charge air inlet and a charge air outlet,
   wherein some of the tubes can be closed by a shut-off member,
   wherein the shut-off member comprises a pivotable flap with a laterally arranged pivot axis, wherein the tubes form a row R and have tube ends which are accommodated in a tube plate of one of the air boxes, wherein the pivot axis is arranged in the direction of the tube row and next to the tube ends in the region of a tube plate, wherein the flap is of rectangular design and, in the closure position, rests on the tube ends, and wherein the flap has at least one cutout for one or more nonclosable tubes.

10. A charge intercooler for a motor vehicle, comprising a heat exchanger unit with tubes through which charge air can flow and comprising air boxes which are connected to the tubes and have a charge air inlet and a charge air outlet, wherein some of the tubes can be closed by a shut-off member, wherein a partition is arranged in the air box and divides the air box into two chambers with two flow cross sections, wherein one flow cross section can be closed by the shut-off member, and wherein the shut-off member comprises a rotary slide.

11. The charge intercooler as claimed in claim 10, wherein the chambers and the partition merge in a funnel-shaped manner into a connecting pipe in which the shut-off member is arranged.

* * * * *